US007440785B2

(12) United States Patent
Steer et al.

(10) Patent No.: US 7,440,785 B2
(45) Date of Patent: Oct. 21, 2008

(54) METHOD AND APPARATUS FOR ENHANCING LINK RANGE IN A WIRELESS NETWORK USING SELF-CONFIGURABLE ANTENNA

(75) Inventors: David Steer, Nepean (CA); Koon Hoo Teo, Nepean (CA); Adrian Smith, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 144 days.

(21) Appl. No.: 10/682,092

(22) Filed: Oct. 10, 2003

(65) Prior Publication Data

US 2004/0176050 A1 Sep. 9, 2004

Related U.S. Application Data

(60) Provisional application No. 60/453,011, filed on Mar. 7, 2003.

(51) Int. Cl.
*H04M 1/00* (2006.01)
*H04B 1/06* (2006.01)

(52) U.S. Cl. ................. 455/575.7; 455/272; 455/279.1; 455/562.1; 455/90.1; 455/73

(58) Field of Classification Search .............. 455/550.1, 455/556.1, 556.2, 557, 560, 565, 566, 575.2–575.7, 455/90.1–90.3, 40.3, 555.2, 272–279.1, 562.1, 455/553, 73, 88; 379/419–440; 370/338, 370/334
See application file for complete search history.

(56) References Cited

U.S. PATENT DOCUMENTS 5,341,375 A * 8/1994 Buchholz et al. ............ 370/349
6,298,223 B1 10/2001 Seow ......................... 455/129

FOREIGN PATENT DOCUMENTS

| | | | |
|---|---|---|---|
| DE | 19653443 | | 3/1998 |
| FR | 2781087 | | 1/2000 |
| WO | 95/13668 | * | 5/1995 |
| WO | 01/52357 | * | 7/2001 |
| WO | 03017591 | | 8/2001 |
| WO | 03/017591 | * | 2/2003 |

OTHER PUBLICATIONS

Apostolopoulos, G.; Williams, D.; Kamat, S.; Guerin, R.; Orda, A.; Przygienda, T.; QoS Routing Mechanisms and OSPF Extensions; Networking Group, Request for Comments: 2676; Category: Experimental; Aug. 1999; pp. 1-50.

* cited by examiner

*Primary Examiner*—Charles N Appiah
*Assistant Examiner*—Emem Stephen

(57) ABSTRACT

Embodiments of the invention facilitate providing wireless links with longer link ranges and/or better suppression of interference than can be provided by the integrated antennas of a typical wireless network node. While, in some cases, it is possible to install intermediate wireless network nodes to hop through long expanses between distant wireless network nodes, it is desirable for distantly spaced wireless network nodes to reach one another through a single transit link (i.e. one hop). This approach is preferable because a single transit link is capable of higher data rates and better interference suppression than multi-hop transit links. The present invention provides methods and apparatus for enhancing the link range achievable by typical wireless network nodes so that distantly spaced wireless network nodes are able to communicate with one another using only a single transit link.

22 Claims, 8 Drawing Sheets

METHOD AND APPARATUS FOR ENHANCING LINK RANGE IN A WIRELESS NETWORK USING SELF-CONFIGURABLE ANTENNA

PRIORITY CLAIM

This application claims the benefit of U.S. Provisional Application No. 60/453,011, filed Mar. 7, 2003, which is hereby incorporated by reference in its entirety.

CROSS REFERENCES TO RELATED APPLICATIONS

This patent application is related to the following Provisional patent applications filed in the U.S. Patent and Trademark Office, the disclosures of which are expressly incorporated herein by reference:

- U.S. Patent Application Ser. No. 60/446,617 filed on Feb. 11, 2003 and entitled "System for Coordination of Multi Beam Transit Radio Links for a Distributed Wireless Access System"
- U.S. Patent Application Ser. No. 60/446,618 filed on Feb. 11, 2003 and entitled "Rendezvous Coordination of Beamed Transit Radio Links for a Distributed Multi-Hop Wireless Access System"
- U.S. Patent Application Ser. No. 60/446,619 filed on Feb. 11, 2003 and entitled "Distributed Multi-Beam Wireless System Capable of Node Discovery, Rediscovery and Interference Mitigation"
- U.S. Patent Application Ser. No. 60/447,527 filed on Feb. 14, 2003 and entitled "Cylindrical Multibeam Planar Antenna Structure and Method of Fabrication"
- U.S. Patent Application Ser. No. 60/447,643 filed on Feb. 14, 2003 and entitled "An Omni-Directional Antenna"
- U.S. Patent Application Ser. No. 60/447,644 filed on Feb. 14, 2003 and entitled "Antenna Diversity"
- U.S. Patent Application Ser. No. 60/447,645 filed on Feb. 14, 2003 and entitled "Wireless Antennas, Networks, Methods, Software, and Services"
- U.S. Patent Application Ser. No. 60/447,646 filed on Feb. 14, 2003 and entitled "Wireless Communication"
- U.S. Patent Application Ser. No. 60/451,897 filed on Mar. 4, 2003 and entitled "Offsetting Patch Antennas on an Omni-Directional Multi-Facetted Array to allow Space for an Interconnection Board"
- U.S. Patent Application Ser. No. 60/453,840 filed on Mar. 11, 2003 and entitled "Operation and Control of a High Gain Phased Array Antenna in a Distributed Wireless Network"
- U.S. Patent Application Ser. No. 60/454,715 filed on Mar. 15, 2003 and entitled "A Method to Efficiently Search for Neighbours using a Directive Antenna System in a Distributed Wireless Network"
- U.S. Patent Application Ser. No. 60/461,344 filed on Apr. 9, 2003 and entitled "Method of Assessing Indoor-Outdoor Location of Wireless Access Node"
- U.S. Patent Application Ser. No. 60/461,579 filed on Apr. 9, 2003 and entitled "Minimisation of Radio Resource Usage in Multi-Hop Networks with Multiple Routings"
- U.S. Patent Application Ser. No. 60/464,844 filed on Apr. 23, 2003 and entitled "Improving IP QoS though Host-Based Constrained Routing in Mobile Environments"
- U.S. Patent Application Ser. No. 60/467,432 filed on May 2, 2003 and entitled "A Method for Path Discovery and Selection in Ad Hoc Wireless Networks"

- U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network"
- U.S. Patent Application Ser. No. 60/480,599 filed on Jun. 20, 2003 and entitled "Channel Selection"

FIELD OF THE INVENTION

This invention relates generally to wireless communications, and, in particular to the design of wireless network nodes.

BACKGROUND

Some wireless networks are made up of wireless network nodes through which subscribers with suitable wireless devices can access communication services. It is common to have wireless nodes with multiple antennas for communicating with other nearby nodes. Each of the antennas is designed to provide gain that is appropriate over a nominal distance—other wise known as link range—between wireless network nodes. An example spacing (or link range) between wireless network nodes is of the order of 150-200 meters.

The antennas provide an expected/designed level of reliability and data rate that is more-or-less guaranteed within the link range. For communications over distances longer than the designed link range, signals need to be routed through one or more intermediate wireless network nodes to bridge the gap between distant wireless network nodes. The intermediate wireless network nodes, if not required for anything else, add additional expense to a wireless network.

An alternative to introducing an intermediate wireless network node is to make the antennas larger, increasing their directionality, so that the link range is lengthened. However, longer link ranges are not required in nominal situations and antennas with increased directionality may in fact limit the performance of a wireless network as a whole since more precise alignment and locking techniques are required to establish and maintain transit links between constituent wireless network nodes. Another problem with increasing the directionality (or gain) of the antennas by making them larger is that such modifications will make the antennas undesirably large.

SUMMARY OF THE INVENTION

According to a first aspect of the invention there is provided a wireless network node for providing transit of data with other wireless network nodes in a wireless network. The wireless network node includes at least one transit antenna to provide data transmission between at least one other wireless network node in the wireless network and the wireless network node; and, an auxiliary transit antenna having a greater gain than the at least one transit antenna. The auxiliary transit antenna provides at least one of: a) data transmission between wireless network nodes separated by a distance greater than that permitting reliable data transmission to other wireless network nodes using the at least one transit antenna; and b) higher rate transmission between wireless network nodes than can be achieved using the at least one transit antenna.

In some embodiments the wireless network node further includes at least one access antenna to permit data transmission both to and from wireless mobile terminals located proximate the wireless network node.

In some embodiments the wireless network node also includes: a transit link radio coupled to the at least one transit antenna and the auxiliary transit antenna for providing data communication between the wireless network node and other wireless network nodes; an access link radio coupled to the at least one access antenna for providing communication between the wireless network node and mobile devices proximate the wireless network node; and a controller unit coupled to both the transit link radio and the access link radio for coupling data transmissions from a mobile device proximate the wireless network node to other wireless network nodes.

According to another aspect of the invention there is provided a wireless network node for providing transit of data with other wireless network nodes in a wireless network. The wireless network node includes: at least one transit antenna to provide data transmission between at least one other wireless network node in the wireless network and the wireless network node; an auxiliary antenna port to which an auxiliary antenna can be coupled; and an antenna detector adapted to detect whether or not an auxiliary antenna is coupled to the auxiliary antenna port; wherein upon detection that the auxiliary antenna is or is not coupled to the auxiliary antenna port, the wireless network node is adapted to include or not include the auxiliary transit antenna port as an option for communications.

In some embodiments the antenna detector is adapted to automatically detect whether or not an auxiliary antenna is coupled to the auxiliary antenna port. In such embodiments the antenna detector measures a standing wave ratio (SWR) for use in a determination of whether or not an auxiliary antenna is or is not coupled to the auxiliary antenna port. Alternatively, the antenna detector measures a signal received through the auxiliary antenna port for use in a determination of whether or not an auxiliary antenna is or is not coupled to the auxiliary antenna port.

In some embodiments the antenna detector is made up of a metal contact that rests adjacent to the auxiliary antenna port when an auxiliary antenna is not inserted into the auxiliary antenna port, and when an auxiliary antenna is inserted into the auxiliary antenna port the metal contact is bridged to a ground contact of the auxiliary antenna port, the antenna detector further comprising an interface circuit to which the metal contact is coupled, the interface circuit outputting a signal that is indicative of the presence or absence of an auxiliary antenna in the auxiliary antenna port.

In other embodiments the antenna detector is made up of a coupler connected in series with the auxiliary antenna port, forward and reverse power detectors connected to the coupler, and a Standing Wave Ratio (SWR) detector and interface circuit connected to the forward and reverse power detectors, wherein in operation power from the auxiliary antenna port is coupled through the coupler and measured by both the forward and reverse power detectors, and the SWR detector and interface circuit compare outputs of the forward and reverse power detectors in order to determine whether or not an auxiliary antenna is coupled to the auxiliary antenna port.

In some embodiments of the invention the wireless network node is placed in combination with an auxiliary antenna coupled to the auxiliary antenna port.

According to another aspect of the invention there is provided a method of operating a wireless network node having an auxiliary antenna port. The method includes the steps of: determining whether or not an auxiliary antenna is coupled to the auxiliary antenna port; and upon determining that an auxiliary antenna is coupled to the auxiliary antenna port, at least one of transmitting and receiving wireless signals through the auxiliary antenna coupled to the auxiliary antenna port; upon determining that an auxiliary antenna is not coupled to the auxiliary antenna port, not using the auxiliary antenna port.

In some embodiments, the method further includes the step of: upon determining that an auxiliary antenna is coupled to the auxiliary antenna port, automatically aligning a beam of the auxiliary antenna with another wireless network node. In such embodiments the beam of the auxiliary antenna is advantageously aligned such that at least one of a strongest possible signal level is received and a lowest packet error rate is achieved on a resulting link.

According to another aspect of the invention there is provided a controller for a wireless network node having an auxiliary antenna port, the controller having a function of: determining whether or not an auxiliary antenna is coupled to the auxiliary antenna port; upon determining that an auxiliary antenna is coupled to the auxiliary antenna port, one of transmitting and receiving wireless signals through the auxiliary antenna coupled to the auxiliary antenna port; and, upon determining that an auxiliary antenna is not coupled to the auxiliary antenna port, not using the auxiliary antenna port as though it did not exist. In some embodiments the controller further includes a function of, upon determining that an auxiliary antenna is coupled to the auxiliary antenna port, coordinating an automatic alignment of a beam of the auxiliary antenna with another wireless network node.

According to another aspect of the invention there is provided a wireless LAN network including in combination: a plurality of wireless network nodes, each wireless network node including at least one transit antenna, and at least one of the plurality of wireless network nodes additionally including an auxiliary antenna having greater gain than the at least one transit antenna also included on the wireless network node; wherein a plurality of transit links is established between the transit antennas of the wireless network nodes; at least one additional transit link is established between two wireless network nodes separated by a distance greater than reliably possible between two transit antennas, each additional transit link employing at least one auxiliary antenna.

In some embodiments the wireless LAN network also includes at least one network access node for providing network access communication between the wireless LAN and another network consisting of at least one of an internet, an intranet, a Public Switched Telephone Network (PSTN) and another communication network.

In some embodiments of the wireless LAN network, at least one of the wireless network nodes also includes an access link radio and at least one access antenna coupled to the access link radio; whereby in operation these wireless network nodes are capable of providing wireless access to communication services to subscribers with suitable mobile devices.

In some embodiments, for each of the wireless network nodes additionally including the auxiliary antenna, a data rate provided through use of the auxiliary antenna is higher than a data rate provided through the use of the at least one transit antenna.

In some embodiments, for each of the wireless network nodes additionally including the auxiliary antenna, a data reliability provided through use of the auxiliary antenna is higher than a data reliability provided through the use of the at least one transit antenna.

In some embodiments, for each of the wireless network nodes additionally including the auxiliary antenna, a level of interference suppression provided through use of the auxiliary antenna is higher than a level of interference suppression provided through the use of the at least one transit antenna.

In some embodiments each of the wireless network nodes additionally including the auxiliary antenna also includes an auxiliary antenna port to which the auxiliary antenna is coupled.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

A self-configuring distributed multi-hop wireless network is described in detail in a co-pending provisional patent application (Ser. No. 60/446,617) entitled "System for Co-ordination of Multi-Beam Transit Radio Links for a Distributed Wireless Access System", filed in the U.S. Patent and Trademark Office on Feb. 11, 2003 and incorporated herein by reference, which enables subscribers with suitable wireless terminals to access a communications network and receive various services. A regular patent application (U.S. patent application Ser. No. 10/682,089) based on the aforementioned co-pending provisional patent application (Ser. No. 60/446,617) has been filed on the same date as the present patent application, and is herein incorporated by reference in its entirety. An example of a system described in the co-pending provisional patent application (Ser. No. 60/446,617) and the formalized version (U.S. patent application Ser. No. 10/682,089) is shown in FIG. 1.

Figure 1:
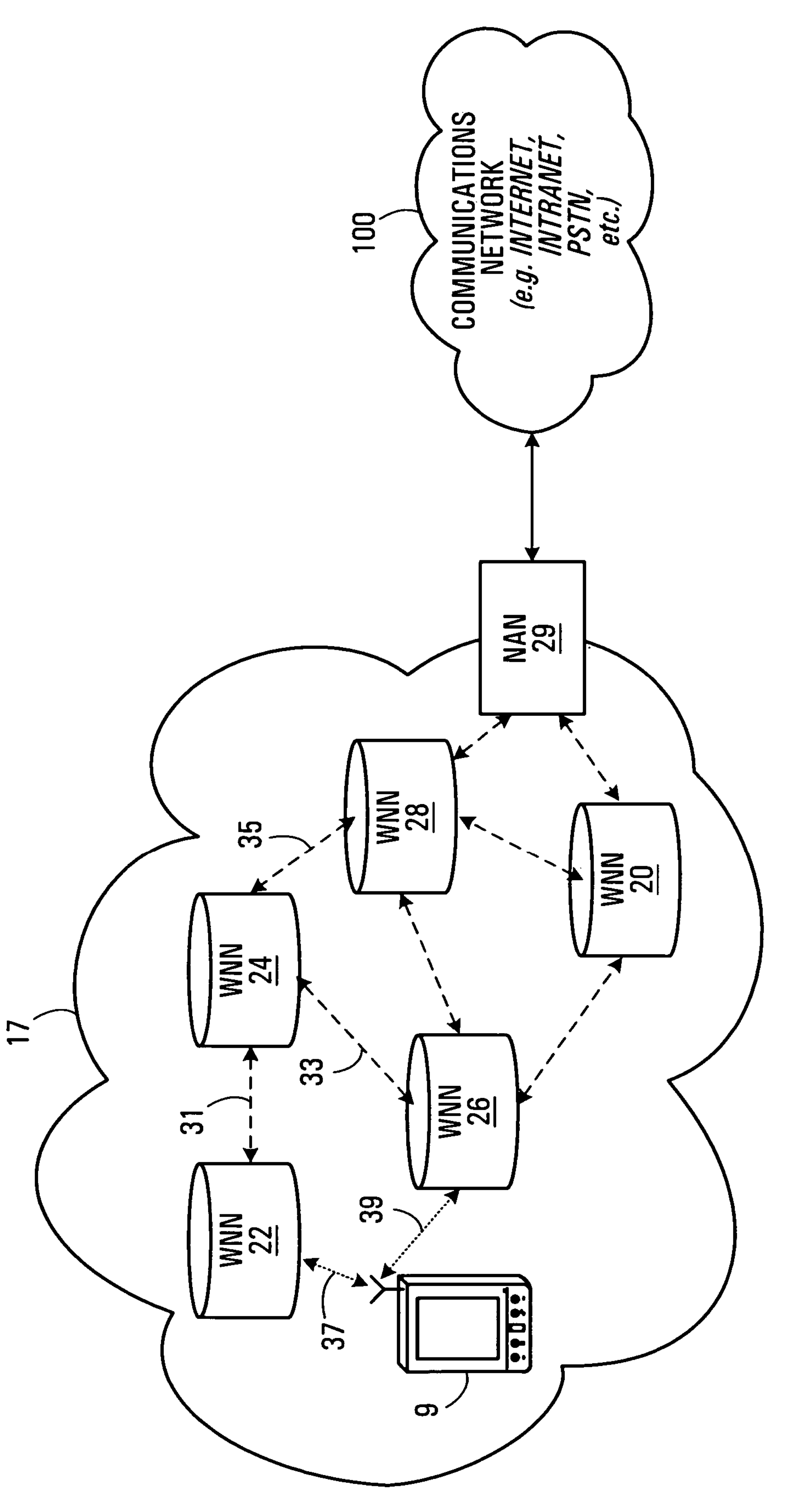
FIG. 1 is a schematic view of a self-configuring distributed multi-hop wireless network in which embodiments of the invention can be employed.

Referring to FIG. 1, the system is depicted as having a number of Wireless Network Nodes (WNN) 20,22,24,26,28 that are distributed about a region 17 (i.e. a geographic area) to be covered, from which users with mobile devices can access communication services. The system shown in FIG. 1 also includes a Network Access Node (NAN) 29 which is coupled to a communications network 100 (e.g. an internet, an intranet, PSTN, etc.).

Each of the wireless network nodes 20,22,24,26,28 and the network access node 29 includes a transit link radio (not shown in FIG. 1) that allows each of the wireless network nodes 20,22,24,26,28 to establish transit links with other wireless network nodes 20,22,24,26,28 and the network access node 29. Transit links permit traffic flow between the wireless network nodes 20,22,24,26,28 and between the wireless network nodes 20,22,24,26,28 and the network access node 29. Examples of transit links between the wireless network node 24 and wireless network nodes 22, 26 and 28 are indicated by dashed lines 31, 33 and 35, respectively. Some embodiments of the invention do not include the network access node 29 and/or the communications network 100.

It is to be emphasized that the system shown in FIG. 1 is an example only. It is to be understood that a transit link can be established between any two wireless network nodes and in practice this connection is typically only limited by the distance between nodes. Also from this example, it should be clear that a wireless network node is capable of establishing and maintaining multiple transit links simultaneously. An arbitrary number and arrangement of wireless network nodes subject to propagation constraints is contemplated.

The wireless network created by the wireless network nodes 20,22,24,26,28 and the network access node 29 provides wireless access to communication services for subscribers with suitable wireless terminals, or simple mobile devices (e.g. phones, PDA's, etc.). A wireless connection between a mobile device and a wireless network node is referred to as an access link and, accordingly, each of the wireless network nodes 20,22,24,26,28 also includes an access link radio (not shown in FIG. 1). For example, as shown in FIG. 1, a mobile device 9 has access links 37 and 39 to the wireless network nodes 22 and 26, respectively. It is to be understood that a mobile device can, under normal circumstances and depending on its location, establish an access link to any wireless network node or network access node. In practice a wireless network node may establish and maintain multiple access links with various respective mobile devices.

Moreover, in the example shown in FIG. 1, the mobile device 9 accesses the communication network 100 through a combination of at least one access link to a wireless network node and one or more transit links between wireless network nodes 20,22,24,26,28 and the network access node 29. It is also possible for traffic, originating from a mobile device in the region 17, to be forwarded between the wireless network nodes 20,22,24,26,28 in order to reach another mobile device within the region 17.

It is noted that the system is not restricted to wireless network nodes that reside in a fixed location. In alternative arrangements, a wireless network node having the functionality to establish both access and transit links, and, accordingly route traffic to and from access and transit links may be further adapted to be mobile. The wireless network nodes that are mobile are thus designated mobile wireless network nodes.

In an example application, mobile wireless network nodes are advantageously deployed on an intra-city commuter train system (or some other public transportation system) that users with suitable mobile devices use to travel to and from work. The users with suitable mobile devices of their own access communication services through these mobile wireless network nodes just as they would through the wireless network nodes that remain in a fixed location.

In other arrangements an end user mobile device is adapted to act not only as a mobile device for its owner, but also as a wireless network node from which other users with suitable mobile devices may access communication services. In such arrangements some mobile devices are equipped so as to be able to establish both access and transit communication links, and, accordingly route traffic to and from access and transit links.

In other alternative arrangements, wireless network nodes can be switched-off at one location and switched-on and discovered at another location, in which case they are considered nomadic wireless network nodes. A more generalized system can operate with an arbitrary mixture of fixed, nomadic and mobile wireless network nodes.

Figure 2:
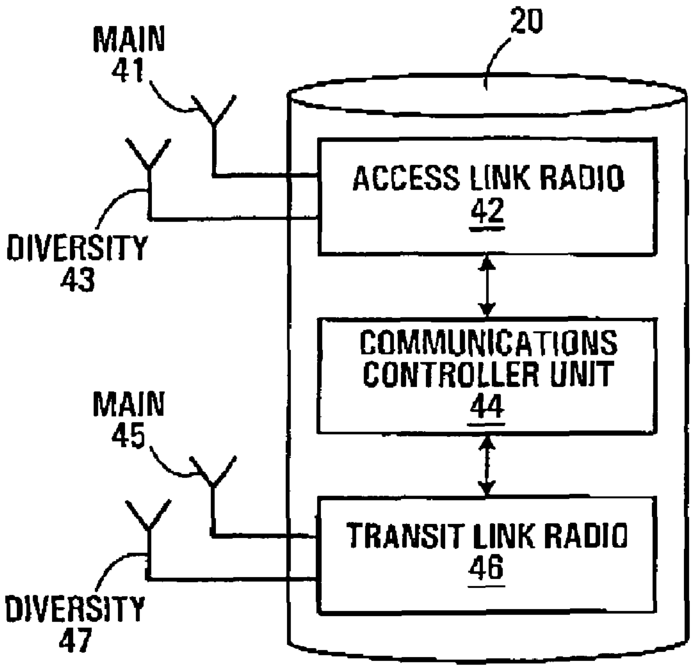
FIG. 2 is a simplified schematic of a wireless network node shown in FIG. 1.

FIG. 2 shows a simplified schematic view of the wireless network node 20 shown in FIG. 1. All of the other wireless network nodes 22,24,26,28 are substantially similar to the wireless network node 20. As was noted above, the wireless network node 20 has an access link radio 42 and a transit link radio 46. The wireless network node 20 also includes a communications controller unit 44 which is coupled to both the access link radio 42 and the transit link radio 46.

The access link radio is coupled to access link antennas 41 and 43, which are main and diversity antennas, respectively. Preferably the access antennas 41 and 43 are both omni-directional (i.e. non-directional) and each preferably having a polarization orthogonal to the other. In some embodiments the access link radio 42 would be coupled to multiple pairs of main and diversity antennas, not just two as shown in FIG. 2. Although the wireless network node 20 includes both a main and a diversity access antenna, in general only one main access link antenna would be required.

More generally, access capabilities are afforded by the provision of one or more antennas that communicate with wireless terminals of a variety of different types (wireless enabled PDAs, personal computers, hybrid telephony-data terminals, and the like). The access antennas can optionally be in the form of omni-directional antennas, or an array of directional antennas arranged to provide 360 degree coverage around the wireless network node. Preferably, at least two access antennas are provided per node for diversity purposes. Alternatively, the access capabilities can be provided by one or more directional antennas, in the event it is desirable to have a more focused access coverage on a particular area.

The transit link radio is coupled to transit link antennas 45 and 47, which are main and diversity antennas, respectively. Again, although the wireless network node 20 includes both a main and a diversity transit antenna, in general only one main transit link antenna would be required. Preferably the transit antennas 45 and 47 are both directional (or "beamed") antennas and each would have a polarization orthogonal to the other. By making the transit link antennas directional, high throughput transit links are enabled between wireless network nodes. In some embodiments the transit link radio 46 is coupled to multiple pairs of main and diversity antennas. Transit link antennas are preferably directional and, thus, multiple pairs of transit link antennas would be required to provide 360-degree coverage around a wireless network node. In some embodiments this is accomplished by including six pairs of main and diversity antennas, the six pairs of main and diversity antennas projecting beams symmetrically spaced from around a wireless device.

More generally, transit capabilities are afforded by an array of directional antennas for communication that are preferably integrated with the node and provide for directional communication with other nodes or, for example, wireless back-haul. The provision of two or more directional antennas is contemplated for the directional antenna array. Preferably at least six antennas are provided to afford a sufficient degree of directional association for each antenna. The antennas of the directional array preferably are also arranged to include diversity. This may be in the form of space or polarization diversity. The use of polarization diversity has the advantage that a more compact array may be implemented.

In operation, the communications controller unit 44 handles traffic in three ways. The first way is to transfer traffic from the access link radio 42 to the transit link radio 46. The second way is to transfer traffic from the transit link radio 46 to the access link radio 42. Finally, the third way is to allow access link traffic to remain within the access link radio 42 and similarly allow transit link traffic to remain with the transit link radio 46. The third way involves directing access link traffic received on one access link to another access link and similarly directing transit link traffic received on one transit link to another transit link.

In order to transfer traffic from the access link radio 42 to the transit link radio 46 the communications controller unit 44 must first receive packets from the access link radio 42. Next, the communications controller unit 44 stores the packets briefly if required in a suitable memory, while determining the appropriate transit link for the packets to reach their correct destination. Similarly, the communications controller unit 44 may receive packets from the transit link radio 46 directed to a mobile unit with which the wireless network node 20 has an access link. The communications controller unit 44 goes through a similar procedure described above except in the reverse direction to route the packets to the appropriate mobile device.

Both the access link radio 42 and the transit link radio 46 must operated according to a suitable air interface according to national and sometimes regional regulations. However, the access link radio 42 and the transit link radio 46 typically employ different frequency bands, and possibly different encoding and modulation schemes. For example, in some embodiments the access link radio 42 may use a bi-directional radio system such as defined by IEEE 802.11 standard series. Equipment for this system is widely available and is of low cost. The transit link radio 46 also preferably utilizes a bi-directional standard such as prescribed in the IEEE 802.11 standard series, but operating at a different radio frequency to avoid interference with the access link system 42.

According to a very specific example, the IEEE 802.11b/g standard prescribes operation in the 2.4 GHz radio band and the IEEE 802.11a standard prescribes operation in the radio bands between 5.15 and 5.85 GHz. Typical radio modules used for these types of radio systems are capable of operation in either the 2.4 or 5 GHz bands. Their assignment to either transit or access link functions is determined by software control and configuration of the communications controller unit 44.

In one particular embodiment, the access link radio 42 is an IEEE 802.11b/g module operating at 2.4 GHz, and the transit link radio 46 is an IEEE 802.11a module operating in the 5.15 and/or 5.85 GHz bands.

It is to be appreciated, however, that the present invention is applicable to other sets of frequencies for one or both the access and transit functions and to other radio system standards, such as IEEE 802.16a. In general a wireless device (e.g. a wireless network node or a mobile unit or a wireless repeater, adapted to coincide with an embodiment of the invention) could use other sets of frequencies for one or both of the access and transit aspects of operation. Other radio system standards such as IEEE 802.16a, the ETSI standard for HIPERLAN 2 (ETSI TS 101-475), or another digital air interface standard, such as any of the Code Division Multiple Access (CDMA) interface standards could also be employed.

FIG. 2 shows elements consisting of the access link radio 42, the transit link radio 46 and the communications controller unit 44 together in one package. This is only one practical arrangement. Various arrangements of packaging and proximity arrangements of the elements (that make up a wireless network node) in relation to one another are contemplated. In other arrangements the elements that make up a wireless network node are provided in a combination of physical packages. Each such package may be independently positioned around a deployment site and the elements are connected together using physical connections (e.g. Ethernet Links, USB links, etc.). It is desirable, for example, to have the access link coverage inside a building or at street level with the transit links beamed from on top of a building so as to clear obstructions en route to other wireless network nodes. Additionally, the communications controller unit could be hidden away in a cabinet inside a building or secure box, if it is not co-located with either one of the access link radio or transit link radio.

Embodiments of the invention facilitate providing wireless links with longer link ranges and/or better suppression of interference than can be provided by the integrated antennas of a wireless network node. While, in some cases, it is possible to install intermediate wireless network nodes to hop through long expanses between distant wireless network nodes, it is desirable for distantly spaced wireless network nodes to reach one another through a single transit link (i.e. one hop). This approach is preferable because a single transit link may be capable of higher data rates and better interference suppression than multi-hop transit links. The present invention provides methods and apparatus for enhancing the link range achievable by wireless network nodes so that distantly spaced wireless network nodes are able to communicate with one another using only a single transit link.

Some embodiments of the invention enable reliable one-hop communications with a wireless network node in situations where a link range to one or more of the neighbouring wireless network nodes exceeds the maximum reliable link range provided by antennas integrated in the wireless network node. In some embodiments this is accomplished by equipping the wireless network node with at least one auxiliary antenna having substantially higher gain than any of the other antennas integrated in the wireless network node. The use of auxiliary antennas is co-ordinated with the use of the antennas integrated into the wireless network node.

Some embodiments of the invention are further enhanced by enabling a wireless network node to automatically detect the connection of auxiliary antennas and either include or ignore them as appropriate in the operations of the wireless network node. Other embodiments also provide methods for assistance with the alignment of the auxiliary antennas with neighbouring wireless network nodes.

A particular context in which the employment of the auxiliary antennas is contemplated involves wireless access radio systems (e.g. wireless networks as shown in FIG. 1), operating in a packet mode, meaning they are only active (transmitting or receiving radio signals) when they are sending or receiving a packet. Otherwise, they are quiescent, "listening" for traffic and occasionally exchanging signalling messages for administration of the radio system, but otherwise quiet. For example, WLAN is increasingly becoming a cost-effective means to deliver data service. The addition of an auxiliary antenna provides a cost optimized solution for providing coverage for wireless network nodes that are beyond the range of the antennas integrated into the wireless network nodes.

It should also be noted that some embodiments of the invention may improve upon the capability of the existing standards (such as the IEEE 802.11 standard series) in a compatible way that enables a software upgrade of existing commercial devices.

It is noted that the addition of an auxiliary antenna in accordance with an embodiment of the invention does not have an impact on the choice of an air interface standard employed within a wireless system.

In the above description the wireless network node 20 has access link and transit link functionality. Some wireless network nodes may not include access link capabilities, and, thus would not include an access link radio or related access link antennas. In accordance with some embodiments of the invention, such wireless network nodes may be equipped with an auxiliary antenna.

With reference to the example system of FIG. 1, in an example application of an embodiment of the invention, auxiliary high gain antennas are used for transit links to the network access node 29. The network access node 29 is where the communication services are delivered to the wireless network from the communications network 100 (e.g. an internet, an intranet, PSTN, etc.). As a consequence, the network access node 29 is typically the node in the wireless network where traffic is typically most concentrated and both the highest data rate and reliability are desired. By providing an auxiliary high gain antenna, high data rates and in turn high levels of traffic are more easily achieved. More generally, an auxiliary antenna can be employed in any wireless network node needing to establish a transit link with another wireless network node that is outside the range of the integrated transit link antennas.

For embodiments featuring a higher rate channel through the auxiliary antenna(s), the auxiliary antenna(s) could be employed in any wireless network node needing to establish a higher rate transit link with another wireless network node—a network access node in the aforementioned scenario.

In some embodiments of the invention, an auxiliary antenna is applied at both wireless network nodes in a single hop transit link, whereas in other applications an auxiliary antenna is sufficiently applied at just one with the other using its integrated antennas. The use of an auxiliary antenna enables special radio link requirements to be addressed without burdening a wireless network node with the additional cost and size of a higher performance integrated antenna system.

Figure 3:
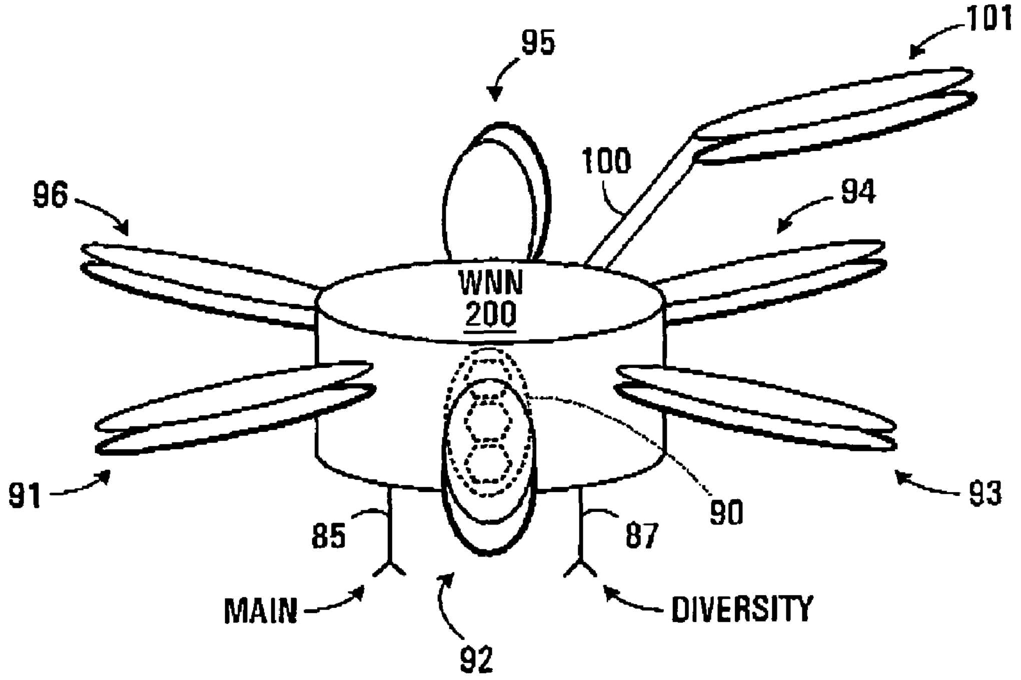
FIG. 3 is a perspective view of a wireless network node provided by an embodiment of the invention.

FIG. 3 is a perspective view of a wireless network node 200 provided by an embodiment of the invention. In this very specific example, the wireless network node 200 has omni-directional access link antennas 85 and 87, which are main and diversity antennas, respectively. The wireless network node also has six pairs of integrated transit link antennas spaced around the wireless network node 200, of which one pair is shown by example at 90. As the transit antennas are preferably beamed (i.e. meaning highly directional), it is more instructive to clearly indicate the respective six pairs of transit link antenna beams 91,92,93,94,95,96 provided by the six pairs of integrated transit link antennas spaced around the wireless network node 200 instead of the actual pairs of integrated transit link antennas per se. Yet for the sake of example, the pair of integrated transit antennas 90 is shown to directly provide the pair of transit link antenna beams 92 in FIG. 3. Finally, according to one particular very specific embodiment of the invention the wireless network node 200 includes a dual-diversity auxiliary transit antenna 100, which provides a pair of highly directional beams 101. For each of the above pairs of antennas and corresponding beams it is to be understood that each of the pair of beams is one of a main and a diversity beam. Thus, each pair of beams provides dual-diversity in its respective pointing direction. Although only one form of antenna diversity is shown in FIG. 3, in alternative embodiments antenna diversity may not be employed, whereas in other embodiments other types of antenna diversity may be employed.

The auxiliary antenna 100 is used as an auxiliary transit link antenna for providing reliable communications over distances longer than the link range of the integrated antennas. In some embodiments, the auxiliary transit link may operate at a rate higher than the other transit links. In preferred embodiments, the auxiliary antenna 100 is highly directional so as to reduce interference with other nodes. Preferably, the auxiliary antenna 100 is used for transit links only, but this need not be the case in all implementations.

More generally, for a given application, the auxiliary antenna can be designed to provide whatever gain or directionality is required.

In one embodiment, the auxiliary antenna 100 is permanently affixed to the wireless network node. In another embodiment, the auxiliary antenna 100 is not permanently affixed, but rather is an optional feature that can be installed at any time. Thus, another related embodiment provides a wireless network node that is equipped with an auxiliary antenna port to which the auxiliary antenna is connectable.

The Provision of an Auxiliary Antenna Port

In accordance with an embodiment of the invention there is provided a wireless network node with the provision for at least one auxiliary antenna port to which an auxiliary antenna can be coupled if required.

In one embodiment, the provision for an auxiliary antenna port is achieved by adding an additional port position to an antenna array switch included in the wireless network node. For example, if there are six integrated antennas (as shown in FIG. 3), a switching circuit (not shown) is extended to include a seventh port position to allow connection to the auxiliary antenna. In alternative embodiments, there are more auxiliary antenna ports to which other auxiliary antennas are connectable.

Figure 4A:
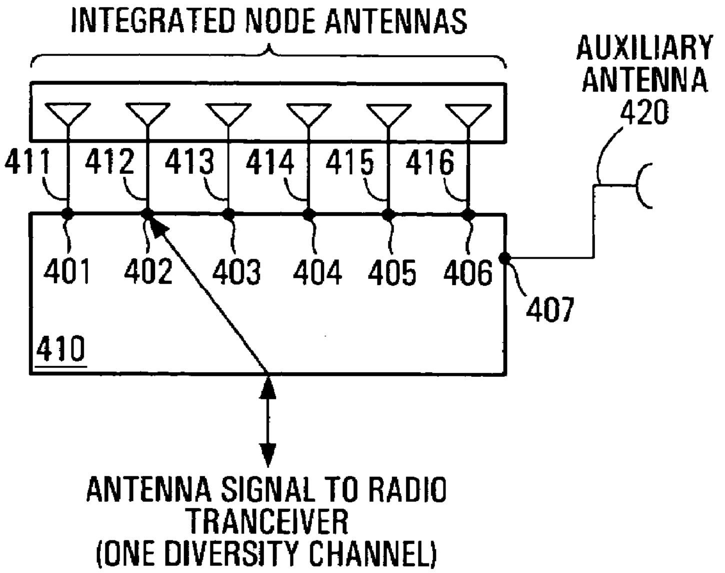
FIG. 4A is a schematic of a first antenna switch arrangement provided by an embodiment of the invention.

FIG. 4A illustrates the connection of an auxiliary antenna 420 to an antenna selection switch 410 that is included in a wireless network node in some embodiments of the invention. The antenna selection switch 410 is a "select-one-of-seven" switch. The antenna selection switch 410 uses six port positions 401,402,403,404,405,406 for six beams provided by six integrated antennas 411,412,413,414,415,416 and a seventh port position 407 for the auxiliary antenna 420. The switch 410 shown in FIG. 4A is only for one set of diversity antennas included in the wireless network node. A similar switch is required for each diversity set of antennas included in the wireless network node.

Figure 4B:
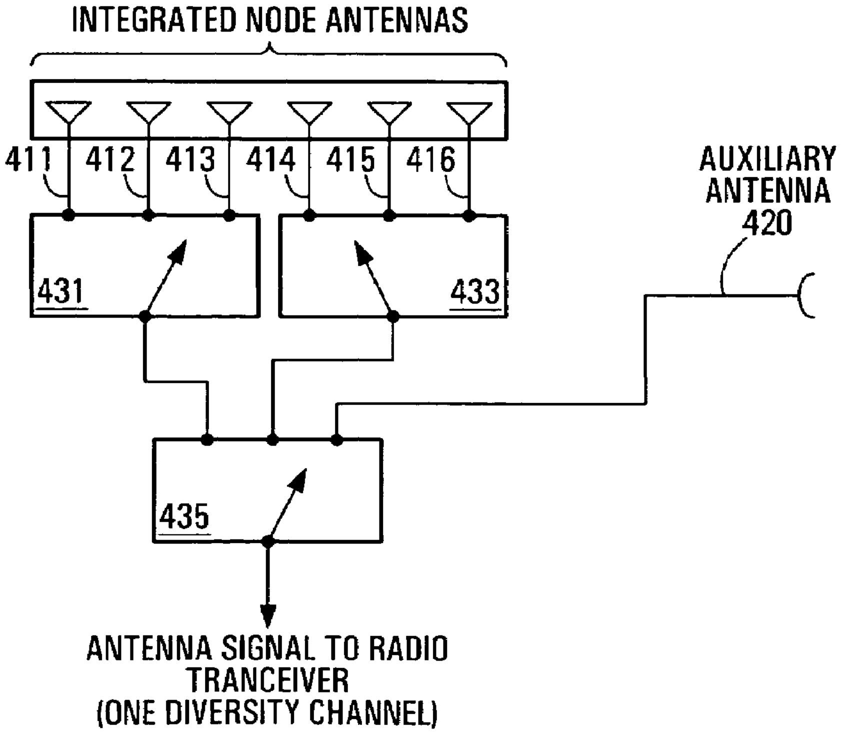
FIG. 4B is a schematic of a second antenna switch arrangement provided by another embodiment of the invention.

Other configurations of switches are possible. For example, as shown in FIG. 4B three, "select-one-of-three" switches 431,433,435 are connected in a two-layer arrangement to select one of the seven antennas 411,412,413,414, 415,416 and 420. A draw back to the switch arrangement shown in FIG. 4B is that a signal must pass through two switches in series to reach one of the six integrated antennas 411,412,413,414,415,416 which increases the signal losses (and decreases SNR). The (one-of-seven) switch 410 shown in FIG. 4A is preferred to the switch arrangement of FIG. 4B because it introduces fewer switch losses. Minimising switch (and other) losses is important to achieving the gain advantage of the auxiliary antenna.

The embodiments of the invention introduced above with respect to FIGS. 3, 4A and 4B provide for the addition of a single auxiliary antenna and hence a single auxiliary antenna port (as indicated in a respective port position in a switching circuit). More generally, this aspect of the invention is extensible to include multiple additional auxiliary antenna ports to accommodate multiple external antennas. Preferably, at least two auxiliary antenna ports are provided to enable diversity.

Automatic Detection of an Auxiliary Antenna

Some embodiments of the invention include methods and apparatus to enable automatic detection of auxiliary antennas by a wireless network node and the automatic inclusion of the auxiliary antennas in the wireless network node's operations without the need for special configuration or manual intervention. This capability enables the simple and rapid deployment of the wireless network nodes and their upgrading or alteration sometime after installation without the need for costly hardware or software upgrades or the provision of new configuration data for wireless network node to be equipped (or unequipped) with auxiliary antennas.

Figure 5:
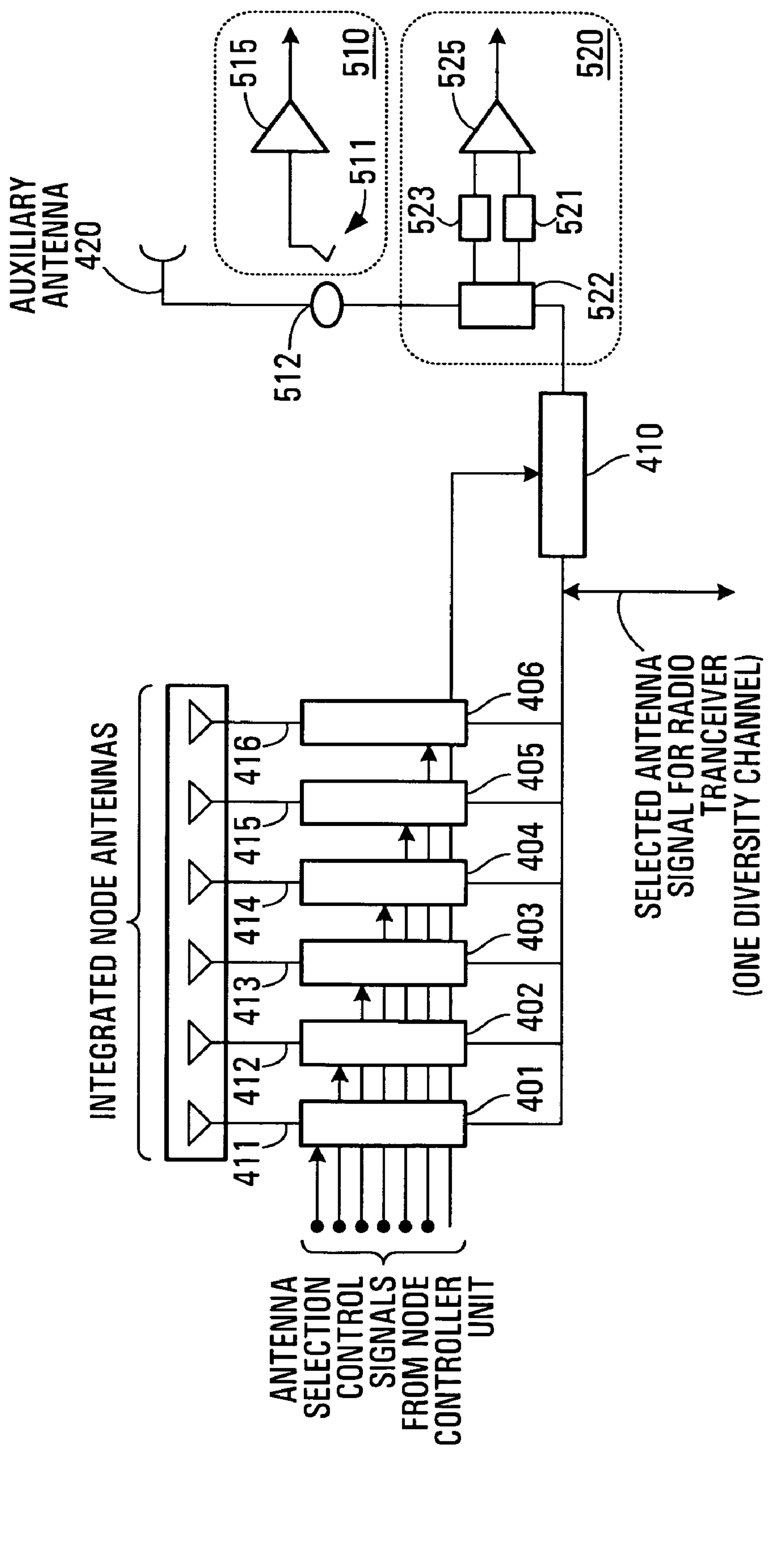
FIG. 5 is a schematic showing two different automatic antenna detection methods provided by an embodiment of the invention.

Two different mechanisms for automatically detecting the connection of the auxiliary antenna are shown in the schematic of FIG. 5. The first mechanism involves the detection of a signal from the antenna and the second mechanism involves measuring a Standing Wave Ratio (SWR) in an auxiliary antenna port.

Other methods for detecting the presence or absence of an auxiliary antenna do exist. For example, another method to detect the presence or absence of an auxiliary antenna involves coupling the receiver to the auxiliary antenna port using an antenna selection switch (e.g. 410 in FIG. 4A) and listening for signals. If a signal is received that is stronger or with lower error rate than signals from the same neighbour received on one of the other integrated antennas, then an auxiliary antenna would be considered connected. It is generally not possible to decide on the presence of an auxiliary antenna simply based on being able to receive signals from the auxiliary antenna port it may be connected to as there may be leakage into the auxiliary antenna port either from the integrated antennas or from the connections associated with the auxiliary antenna port (and its connector). Receiving signals that are stronger or with lower error rate than the other integrated antennas indicates the presence of an auxiliary antenna with useful gain. Using the receiver in this way to detect the presence of an auxiliary antenna has the disadvantage that the neighbours must be transmitting signals to be received by a wireless network node through an auxiliary antenna, and decoding such signals takes some time. Alternatives, for example those shown in FIG. 5, will often be preferable as there is no delay in their indication and no external signals are required.

The first mechanism shown in FIG. 5, encircled by a dashed line 510, is made up of a metal contact 511 that rests adjacent to a connector 512 (i.e. the auxiliary antenna port) when an auxiliary antenna is not inserted into the connector 512. When an auxiliary antenna is inserted the metal contact 511 is bridged to a "ground" sleeve of the connector 512. In some embodiments the ground sleeve is the outer conductor of a coaxial-transmission line type connector; however, in other embodiments other types of transmission line connectors are more appropriate. The signal from the contact 511 may then be coupled to a controller (not shown) through a suitable interface circuit 515 as depicted in FIG. 5. The output of the interface circuit 515 indicates the presence or absence of an auxiliary antenna. The controller reacts to either include or exclude an auxiliary antenna (connected to the auxiliary antenna port) upon receiving a signal from the interface circuit 515 that indicates the presence or absence of an auxiliary antenna, respectively. This fist mechanism is inexpensive and simple, however, the mechanical contact made by the metal contact 511 may be unreliable if an auxiliary antenna is inserted and removed numerous times and in situations where the wireless network node is frequently bumped around.

The second mechanism shown in FIG. 5, encircled by a dashed line 520, is a means for measuring the SWR in the connector 512. This detector consists of a coupler 522 in series with the connector 512. The coupler is also connected to forward and reverse power detectors 521 and 523, respectively. A SWR detector and interface circuit 525 is used to compare forward and reverse powers (from power detectors 521 and 523) and to indicate the difference or the ratio of the two. If an auxiliary antenna is not connected, no power will pass out of the (open) connector 512 and the detector 525 will indicate no net forward power. If the auxiliary antenna is connected, power will pass through to the auxiliary antenna and the detector 525 will indicate a net forward power and thus detect the presence of the auxiliary antenna. Although this second mechanism involves additional components, it is not subject to mechanical failure like the first mechanism and is thus more robust. Moreover, this second mechanism assures the actual functioning of the antenna connected to the auxiliary antenna port since it involves measuring power flow to and from an auxiliary antenna. Any combination of the mechanisms for detecting the presence or absence of an auxiliary antenna can be employed. The preferable choice is to use a low cost but sufficiently reliable mechanism or combination of mechanisms.

Additional software control is also provided in the controller such that an auxiliary antenna can be detected as being connected and activated when needed for operations. This is an extension to the software that would otherwise be supervising/polling all of the antennas integrated into a wireless network node. This software may also be provisioned to select a sub-set of the available antennas for particular applications. For example, in wireless network nodes near the network access node, where it may be desirable to only use auxiliary antennas to maximize throughput for certain selected neighbours. In such a situation, the wireless network nodes may be configured to only operate the auxiliary antennas, in which case the integrated antennas are not activated by the controlling software. In addition to selecting the use of a detected auxiliary antenna, the integrated antennas can also be tested and those that are ineffective due to blocking by nearby objects (e.g. walls or large signs) or interference sources are excluded from general use.

Figure 6:
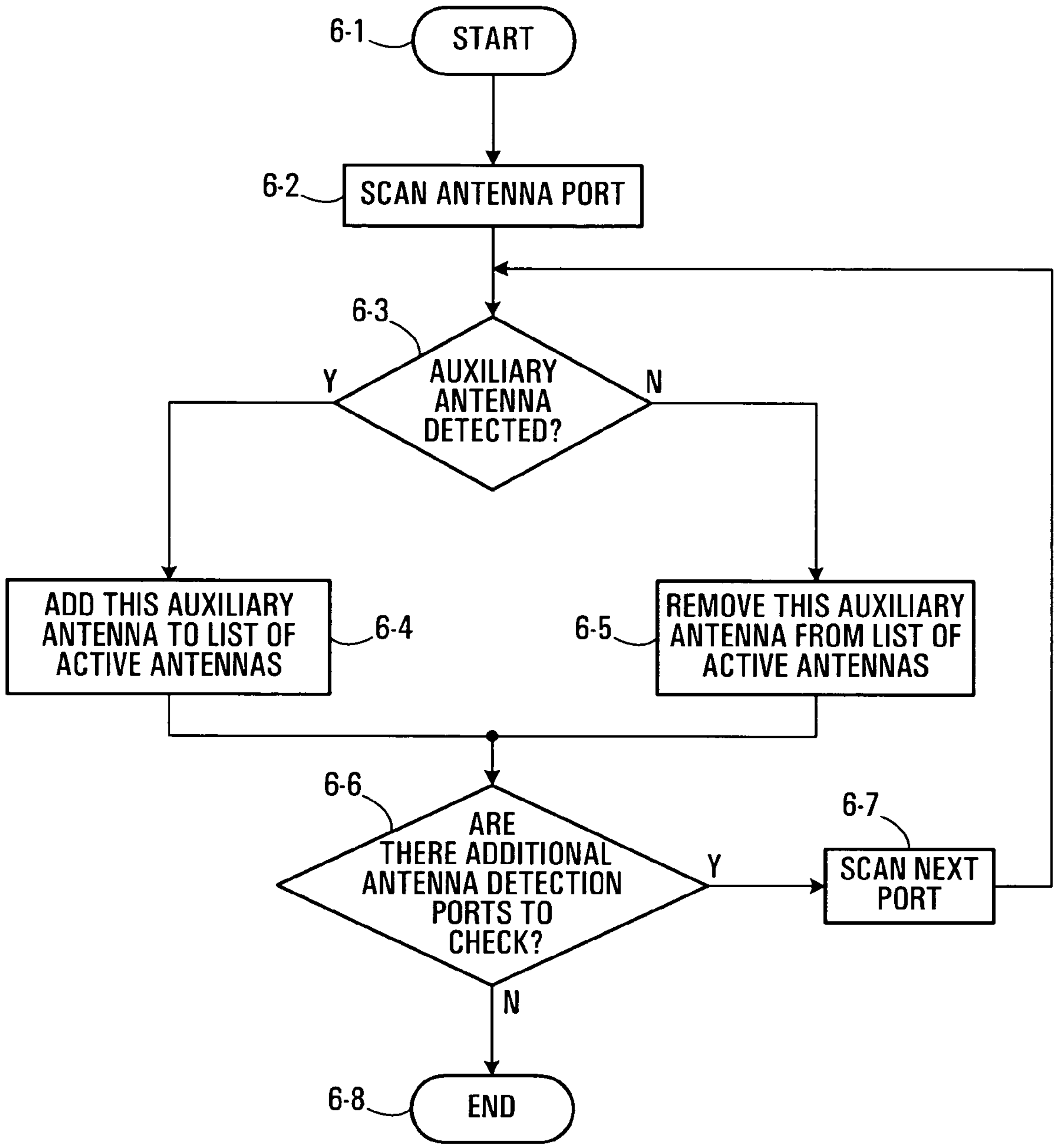
FIG. 6 is a flow chart illustrating a method of automatically detecting the presence or absence of an auxiliary antenna according to an embodiment of the invention.

Shown in FIG. 6 is a flow chart illustrating a method for detecting the presence or absence an auxiliary antenna at an auxiliary antenna port. The method starts at step 6-1 in which an auxiliary antenna port is selected to be scanned. In some embodiments, there is only one auxiliary antenna port to be scanned. At step 6-2 the selected auxiliary antenna port is scanned while in other embodiments an arbitrary first auxiliary antenna port is scanned. At step 6-3 it is determined whether or not an auxiliary antenna is present or absent. If an auxiliary antenna is detected as being present (yes path, step 6-3) then the method proceeds to step 6-4. On the other hand, if an auxiliary antenna is not detected (i.e. it is assumed absent, no path, step 6-3) then the method proceeds to step 6-5.

At step 6-4 the detected auxiliary antenna is added to a list of active antennas within the wireless network node. Of course it would not need to be added to the list if it was already on the list from a previous scan. Conversely, at step 6-5 it is ensured that an indication that an antenna is present at the scanned port is not present on the list of active antennas (i.e. it would not be added if it was not on the list and it would be removed it was on the list). After both steps 6-4 and 6-5, the method proceeds to step 6-6 where it is determined whether or not there are any other auxiliary antenna ports to be scanned.

If there are no other auxiliary antenna ports to be scanned (no path, step 6-6) the method ends at step 6-8. On the other hand, if there are additional auxiliary antenna ports to be scanned (yes path, step 6-6) then the method proceeds to step 6-7. At step 6-7 a next auxiliary antenna port is selected and scanned after which the method proceeds back to step 6-3.

In some embodiments of the invention the above-described method (or a derivative of it) is implemented in a controller included in a wireless network node. In such embodiments, the controller would be some suitable combination of software and/or hardware and/or firmware.

Method of Automatic Alignment

Some embodiments of the invention include methods and apparatus to enable automatic assistance during installation for alignment of one or more auxiliary antennas. In this situation, the direction for pointing to the another wireless network node is known and during the installation the auxiliary antenna(s) must be aligned with the selected neighbour/target wireless network node. This may be performed manually by a technician, or automatically through an electromechanical mechanism under the control of a wireless network node controller. An illustration of a wireless network node equipped with an auxiliary antenna is shown in FIG. 7A and a pointing/installation tool is illustrated in FIG. 7B.

Figure 7A:
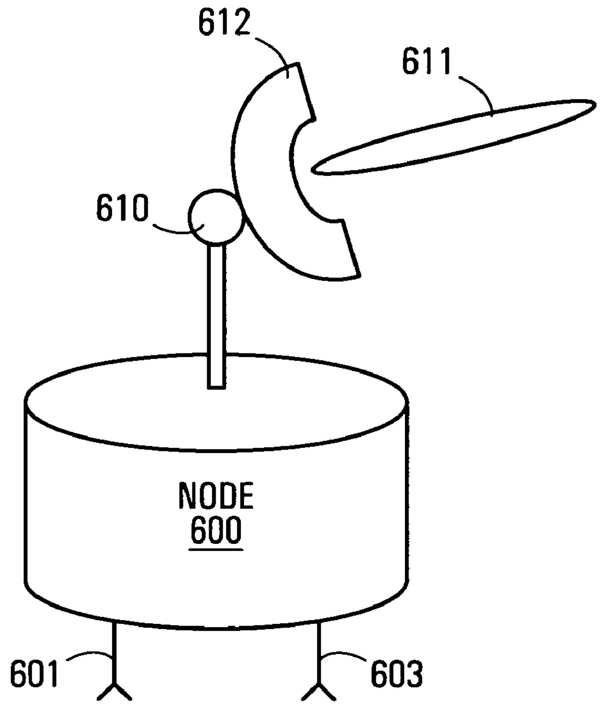
FIG. 7A is an illustration of a wireless network node provided with an auxiliary antenna and directional mount according to an embodiment of the invention.

Referring to FIG. 7A shown is a very specific example of a wireless network node 600 with an auxiliary antenna and directional mount 610 provided by an embodiment of the invention. The wireless network node 600 also has two omnidirectional access link antennas 601 and 603. The auxiliary antenna and the directional mount 610 have an alignment sight 612. The alignment sight 612 aids in the alignment of the antenna beam 611 provided by the auxiliary antenna.

Figure 7B:
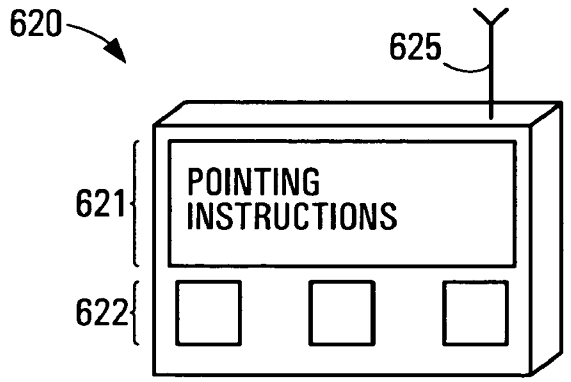
FIG. 7B is an illustration of a pointing/installation tool adapted to communicate with the wireless network node of FIG. 7A.

With further reference to FIG. 7B, shown is a pointing/installation tool 620 with which the auxiliary antenna and directional mount 610 can be controlled. The pointing/installation tool 620 has an antenna 625, a display 621 and input controls 622. In this very specific embodiment the pointing/installation tool 620 sends and receives commands and feedback, respectively, through the access link antennas 601 and 603 of the wireless network node 600. Accordingly, the respective radio module of the pointing/installation tool 620 is tuned to the same frequency as the access link radio (not shown) within the wireless network node 600.

In some embodiments the pointing/installation tool 620 could, for example, be adapted from a laptop PC or PDA (Personal Digital Assistant) equipped with a software application to receive measurement results and display them. The pointing/installation tool 620 may conveniently be connected to a wireless network node using a wireless link as suggested above (using a transmitter and antenna 625) but it could also be connected with a cable connection such as an Ethernet link. If a wireless network node is configured for automatic steering of an auxiliary antenna, then the pointing/installation tool 620 could send steering commands to the wireless network node, request measurements of the radio signals, receive results in response and drive the auxiliary antenna to the desired alignment.

Regardless of whether or not the alignment procedure is automatic (or manual) the auxiliary antenna and directional mount 610 will require mechanical adjustment to point the auxiliary antenna in the desired direction, suitably fixing the auxiliary antenna and the directional mount 610 in an optimal alignment. For the manual alignment, a technician must be provided with an indication of the correct alignment and feedback as it is adjusted. For preliminary alignment, the antenna is provided with the alignment sight 612. The alignment sight 612 may be in the form of an arrow and sight-lines printed or moulded on the antenna to indicate its beam direction. The technician would sight along these lines to align the auxiliary antenna with a distant node. For longer ranges (such as with higher gain antennas), there may be an additional mounting for a telescopic sight (such as often used for rifles). This sighting device would be fitted by the technician as part of the alignment process for accurate sighting over long distances and removed when completed.

With the auxiliary antenna roughly aligned using the alignment sight 612, the technician would use the pointing/installation tool 620 to finish the alignment for optimal performance. In order to do this the technician could monitor the display 621 to view measurements of the received signal strength or packet loss on the link using the auxiliary antenna. The technician would thus make the fine adjustment of the direction of the auxiliary antenna to achieve "a desired indication" on the display 621. The desired indication is an indication to the user that the best signal strength or best error rate for a link has been achieved. The desired indication may be signified by a brightest illumination of a lamp, or a strongest, most vibrant green color, or a strongest audio tone. For example, this may be signified by a bright illumination of an indicator lamp or display color changing from red to yellow to green. When the desired indication is achieved the auxiliary antenna would be fixed in alignment on its mounting bracket.

Figure 8:
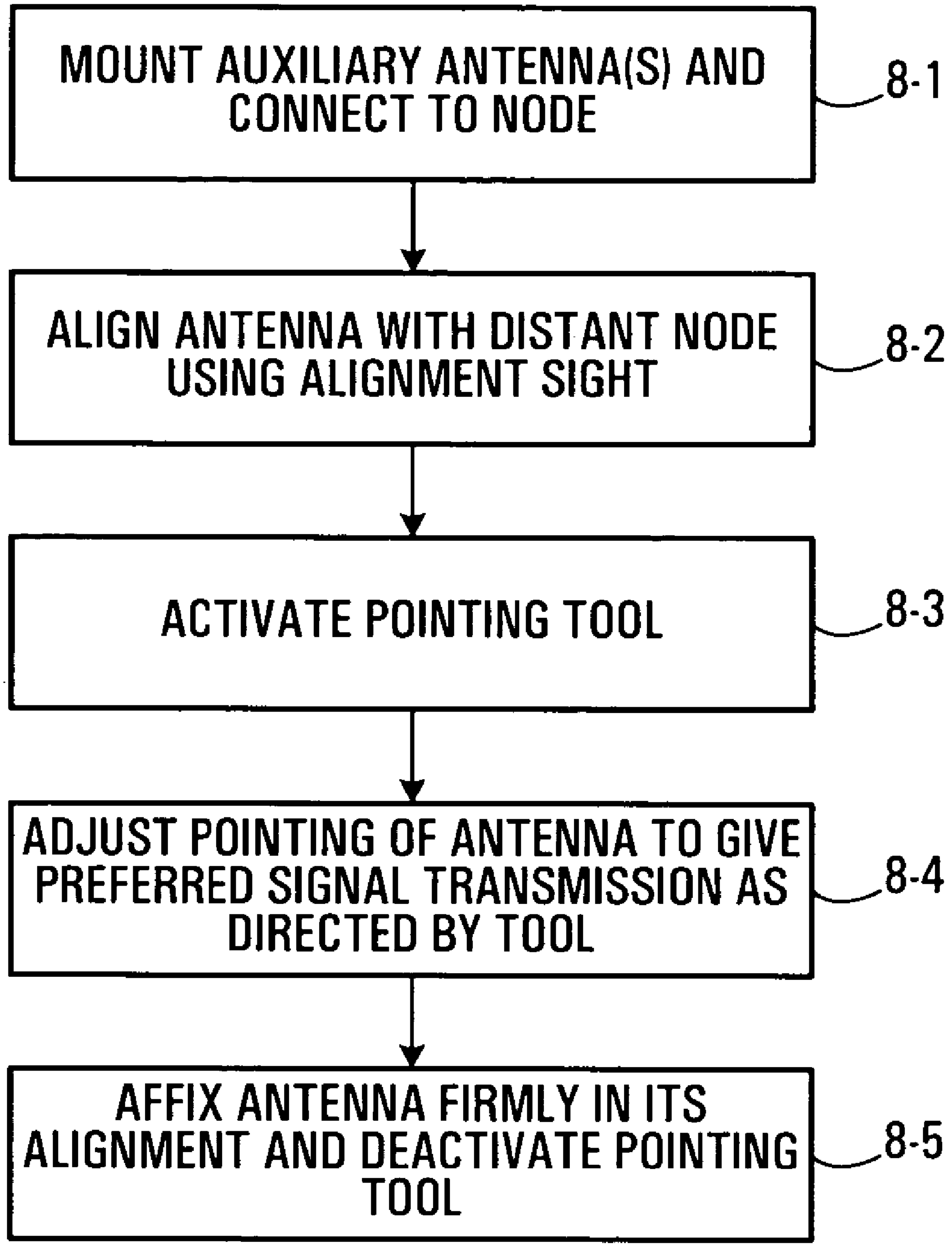
FIG. 8 is a flow chart illustrating a method of aligning an auxiliary antenna.

Shown in FIG. 8 is a method for aligning an auxiliary antenna with a distant wireless network node. The first step 8-1 is to mount and connect the auxiliary antenna(s) to the wireless network node. Next, at step 8-2 the auxiliary antenna is roughly aligned using an alignment sight. Following the rough alignment, a pointing/installation tool is activated at step 8-3. Using the pointing/installation tool the auxiliary antenna is adjusted at step 8-4 in order to find an optimal alignment. Finally at step 8-5 the auxiliary antenna is firmly fixed in its optimal alignment and the pointing/installation tool is deactivated. The steps shown in FIG. 8 can be performed manually by a technician or automatically by an automatic pointing mechanism included in a wireless network node.

Figure 9:
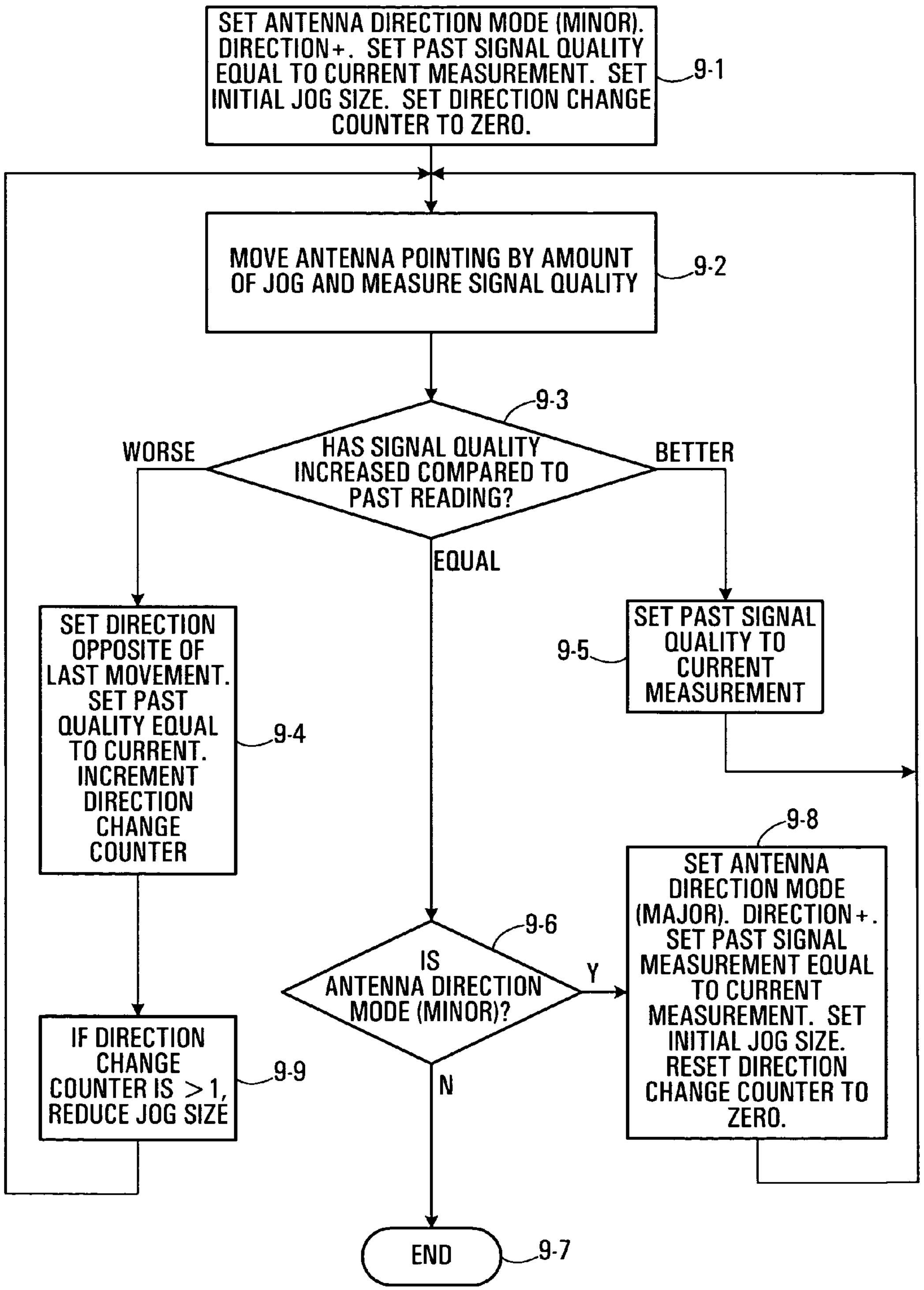
FIG. 9 is a flow chart illustrating a method of operation for a pointing/installation tool used to align an auxiliary antenna.

FIG. 9 is a flow chart illustrating a novel method of operation for a pointing/installation tool used to locate to optimal alignment location, such as the pointing/installation tool shown in FIG. 7B. At step 9-1, an antenna direction mode is set to "minor" as opposed to "major", the direction is set to "+" as opposed to "−", a past signal quality measurement is set equal to the current signal quality measurement, an initial "jog" size is set, and a direction change counter is set to zero.

The modes minor and major are with reference to the axis of an antenna beam provided by an auxiliary antenna. The directions + and − are along these axis.

In some embodiments the initial jog size is a few percent of the beamwidth in the direction of motion (major or minor axis). For example, the initial jog size may be set to 2% of the beamwidth. With an initial jog size of 2% the search for the optical alignment position would at most go through 25 steps to reach the optical alignment position (for a given direction) if the initial pointing was at the edge of the beam radiated by the auxiliary antenna. In some embodiments the jog size is then reduced to between a third and a half of its previous size on subsequent iterations under conditions that are outlined below. This may minimize the time it takes to find the optimal alignment of the auxiliary antenna.

At step 9-2 the antenna pointing is moved by the jog size (e.g. 2%) and a new measure of the current signal quality is measured. At step 9-3 it is determined how the signal quality changed with respect to the past signal quality measurement. If the current signal quality is worse (worse path, step 9-3) then the method proceeds to step 9-4. Alternatively, if the current signal quality is better (better path, step 9-3) then the method proceeds to step 9-5. However, if the current signal quality is the same as the past signal quality (equal path, step 9-3) then the method proceeds to step 9-6.

The comparison would be considered "equal" when the numbers were the same within an allowance and/or resolution limit and/or if a loop counter threshold has been exceeded. More precisely the comparison is considered "equal" when: i) the signal quality is comparable to within some tolerance that is determined by the accuracy and resolution of the measurements; and/or ii) the jog size has become less than the practical resolution of motion of the directional mount; and/or iii) the number of changes of direction has exceeded some threshold (e.g. 25) meaning the search has passed over the peak sufficiently often to be considered very close. For example, with reference to "iii)" the initial pointing may have been the optimal alignment position, in which case all changes to the antenna alignment would reduce the signal quality.

At step 9-4 the direction is set opposite of the last movement (i.e. from + to −, or from − to +), the past signal quality measurement is set equal to the current signal quality measurement, and the direction change counter is incremented. After step 9-4 the method proceeds to step 9-9 in which the jog size is reduced if the direction change counter is greater than one (i.e. >1). There may be a change of direction during the first couple of jogs if the method initially started to point the auxiliary antenna away from the optimal alignment. The effect is that the first direction change is ignored. After the first direction change all other direction changes are interpreted as a change past the optimal alignment position, and thus indicative of a good opportunity to reduce the jog size. After step 9-9 the method proceeds back to step 9-2.

At step 9-5 the past signal quality measurement is set to the current signal quality measurement. After step 9-5 the method proceeds back to step 9-2.

At step 9-6 it is determined whether the antenna direction mode is minor or major. If the antenna direction mode is major (no path, step 9-6) then the method proceeds to end at step 9-7. On the other hand, if the antenna direction mode is minor (yes path, step 9-6) then the method proceeds to step 9-8. At step 9-8 the antenna direction mode is set to "major", the direction is set to "+" as opposed to "−", a past signal quality measurement is set equal to the current signal quality, a new initial "jog" size is set, and the direction change counter is reset to zero. The entire method is then repeated for this direction mode starting at step 9-2.

Again, the automatic alignment of the antenna could be performed through the use of a suitable electro-mechanical system to steer the direction of the auxiliary beam under the control of software. In this configuration, the node would use the internal software for the display indication together with control of the motor drive to steer the antenna to get the best desired pointing (i.e. antenna alignment with the strongest signal strength and lowest packet error rate on the link).

In embodiments of the invention where there are two high gain directional antennas at each end of a link, more accurate alignment may be required. In the situations, unless the antennas are initially very nearly aligned, there may be insufficient signal strength received by each of the two auxiliary antennas to align them. The use of the optical sight to align the auxiliary antennas initially is an important step in these situations. Here use can also be made of the antennas integrated in the wireless network node. These may be used to provide a link between the two wireless network nodes. This link can be used to communicate alignment information messages between the wireless network nodes. The received signal strength or packet error rate, for example, received at the other wireless network node using the auxiliary antenna may be returned to the sending wireless network node using such a channel. This information may be used to help align the auxiliary antennas.

What has been described is merely illustrative of the application of the principles of the invention. Other arrangements and methods can be implemented by those skilled in the art without departing from the spirit and scope of the present invention.

We claim:

1. A wireless network node for providing transit of data with other wireless network nodes in a wireless network, the wireless network node comprising:

at least one transit antenna to provide data transmission between at least one other wireless network node in the wireless network and the wireless network node;

an auxiliary transit antenna port to which an auxiliary transit antenna can be coupled; and an antenna detector adapted to detect whether or not an auxiliary transit antenna is coupled to the auxiliary transit antenna port;

wherein the at least one transit antenna are available to establish one or more transit links;

wherein upon detection that the auxiliary transit antenna is not coupled to the auxiliary transit antenna port, the wireless network node uses only the at least one transit antenna for communications;

wherein upon detection that the auxiliary transit antenna is coupled to the auxiliary transit antenna port, adding the auxiliary transit antenna to a list of available antennas adapted for at least one of transmitting and receiving wireless signals so that the auxiliary transit antenna can be included or ignored as appropriate for at least one of transmitting and receiving wireless signals through the auxiliary transit antenna coupled to the auxiliary transit antenna port.

2. The wireless network node of claim 1 wherein the antenna detector is adapted to automatically detect whether or not an auxiliary transit antenna is coupled to the auxiliary transit antenna port.

3. The wireless network node of claim 2, wherein the antenna detector measures a standing wave ratio (SWR) for use in a determination of whether or not an auxiliary transit antenna is or is not coupled to the auxiliary transit antenna port.

4. The wireless network node of claim 2, wherein the antenna detector measures a signal received through the auxiliary transit antenna port for use in a determination of whether or not an auxiliary transit antenna is or is not coupled to the auxiliary transit antenna port.

5. The wireless network node of claim 2, wherein the antenna detector comprises a metal contact that rests adjacent to the auxiliary transit antenna port when an auxiliary transit antenna is not inserted into the auxiliary transit antenna port, and when an auxiliary transit antenna is inserted into the auxiliary transit antenna port the metal contact is bridged to a ground contact of the auxiliary transit antenna port, the antenna detector further comprising an interface circuit to which the metal contact is coupled, the interface circuit outputting a signal that is indicative of the presence or absence of an auxiliary transit antenna in the auxiliary transit antenna port.

6. The wireless network node of claim 2, wherein the antenna detector comprises a coupler connected in series with the auxiliary transit antenna port, forward and reverse power detectors connected to the coupler, and a Standing Wave Ratio (SWR) detector and interface circuit connected to the forward and reverse power detectors, wherein in operation power from the auxiliary transit antenna port is coupled through the coupler and measured by both the forward and reverse power detectors, and the SWR detector and interface circuit compare outputs of the forward and reverse power detectors in order to determine whether or not an auxiliary transit antenna is coupled to the auxiliary transit antenna port

7. The wireless network node of claim 1 in combination with an auxiliary transit antenna coupled to the auxiliary transit antenna port.

8. The wireless network node of claim 7, further comprising at least one access antenna to permit data transmission both to and from wireless mobile terminals located proximate the wireless network node.

9. The wireless network node of claim 8, further comprising:

a transit link radio coupled to the at least one transit antenna and the auxiliary transit antenna for providing data communication between the wireless network node and other wireless network nodes;

an access link radio coupled to the at least one access antenna for providing communication between the wireless network node and mobile devices proximate the wireless network node; and a controller unit coupled to both the transit link radio and the access link radio for coupling data transmissions from a mobile device proximate the wireless network node to other wireless network nodes.

10. The wireless network node of claim 7, wherein the auxiliary transit antenna is aimed so signals therefrom are transmitted to another specific wireless network node.

11. The wireless network node of claim 10, wherein the another specific wireless network node is located at a distance from the wireless network node greater than a distance permitting reliable transmission of data using the at least one transit antenna.

12. The wireless network node of claim 7, wherein the auxiliary transit antenna has a gain greater than that of the at least one transit antenna.

13. The wireless network node of claim 7 further comprising a directional-mount connected between the auxiliary transit antenna and auxiliary transit antenna port of the wireless network node.

14. The wireless network node of claim 13, wherein the directional-mount is adjustable in order to permit an optimal alignment of the auxiliary transit antenna.

15. The wireless network node of claim 7, wherein the auxiliary transit antenna provides the use of a substantially higher data rate than that provided by the at least one transit antenna.

16. The wireless network node of claim 7, wherein the auxiliary transit antenna provides substantially better interference suppression than that provides by the at least one transit antenna.

17. A method of operating a wireless network node having an auxiliary transit antenna port, the method comprising:

determining whether or not an auxiliary transit antenna is coupled to the auxiliary transit antenna port; and upon determining that an auxiliary transit antenna is coupled to the auxiliary transit antenna port, adding the auxiliary transit antenna to a list of available antennas adapted for at least one of transmitting and receiving wireless signals so that the auxiliary transit antenna can be included or ignored as appropriate for at least one of transmitting and receiving wireless signals through the auxiliary transit antenna coupled to the auxiliary transit antenna port;

upon determining that an auxiliary transit antenna is not coupled to the auxiliary transit antenna port, removing the auxiliary transit antenna from a list of active antennas so that the auxiliary transit antenna will not be used.

18. The method according to claim 17, further comprising, upon determining that an auxiliary transit antenna is coupled to the auxiliary transit antenna port, automatically aligning a beam of the auxiliary transit antenna with another wireless network node.

19. The method according to claim 18, wherein the beam of the auxiliary transit antenna is aligned such that at least one of a strongest possible signal level is received and a lowest packet error rate is achieved on a resulting link.

20. A controller for a wireless network node having an auxiliary transit antenna port, the controller having a function of:

determining whether or not an auxiliary transit antenna is coupled to the auxiliary transit antenna port;

upon determining that an auxiliary transit antenna is coupled to the auxiliary transit antenna port, adding the auxiliary transit antenna to a list of available antennas adapted for one of transmitting and receiving wireless signals so tat the auxiliary transit antenna can be included or ignored as appropriate for one of transmitting and receiving wireless signals through the auxiliary transit antenna coupled to the auxiliary transit antenna port; and upon determining that an auxiliary transit antenna is not coupled to the auxiliary transit antenna port, removing the auxiliary transit antenna from a list of active antennas so that the auxiliary transit antenna will not be used.

21. The controller of claim 20, further comprising a function of, upon determining that an auxiliary transit antenna is coupled to the auxiliary transit antenna port, coordinating an automatic alignment of beam of the auxiliary transit antenna with another wireless network node.

22. The controller of claim 21, wherein the beam of the auxiliary transit antenna is aligned such that at least one of a strongest possible signal level is received and a lowest packet error rate is achieved on a resulting link.

* * * * *

UNITED STATES PATENT AND TRADEMARK OFFICE

CERTIFICATE OF CORRECTION

PATENT NO. : 7,440,785 B2
APPLICATION NO. : 10/682092
DATED : October 21, 2008
INVENTOR(S) : David Steer et al.

It is certified that error appears in the above-identified patent and that said Letters Patent is hereby corrected as shown below:

Claim 20 (column 20, line 10) - -- tat -- should be “that”

Claim 21 (column 20, line 23) - the word “a” is missing from the expression “...automatic alignment of a beam”

Signed and Sealed this

Thirty-first Day of March, 2009

JOHN DOLL
*Acting Director of the United States Patent and Trademark Office*